United States Patent [19]

Richter

[11] 3,976,668
[45] Aug. 24, 1976

[54] AMINOBENZENESULFONYL-ACRYLAMIDES

[75] Inventor: Sven U. K. A. Richter, Brookline, Mass.

[73] Assignee: Sanitized, Inc., New York, N.Y.

[22] Filed: June 27, 1974

[21] Appl. No.: 483,656

Related U.S. Application Data

[60] Division of Ser. No. 228,410, Feb. 22, 1972, Pat. No. 3,821,399, which is a continuation of Ser. No. 844,176, July 23, 1969, abandoned, which is a continuation-in-part of Ser. No. 545,835, April 28, 1966, abandoned.

[52] U.S. Cl.............................. 260/397.6; 260/465 D; 260/465 E; 260/465 K; 260/561 S; 424/304; 424/309; 424/324

[51] Int. Cl.².................................. C07C 147/00

[58] Field of Search.............................. 260/397.6

[56] References Cited
UNITED STATES PATENTS 2,919,225  12/1959  Heininger et al. ................ 424/304
3,541,119  11/1970  Richter et al. .................... 260/397.6

*Primary Examiner*—Dale R. Ore
*Attorney, Agent, or Firm*—Hubbell, Cohen, Stiefel & Gross

[57] ABSTRACT

A method of preventing the growth of microorganisms by contacting the microorganisms with a bioactive compound which may be described by one of the following formulas:

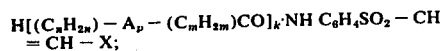

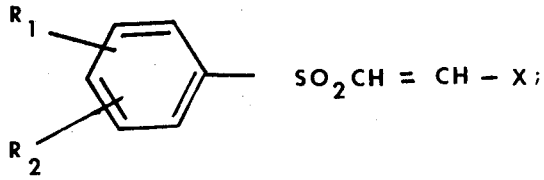

or

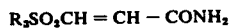

in which A is benzene or napthalene, X is —CN, —CONH$_2$, —COOR, —SO$_2$R, —SO$_3$R, —NO$_2$ or —COR, R$_1$ is an amino, acylamido or nitro group, R$_2$ is hydrogen or a lower alkyl group, R$_3$ is an alkyl, substituted alkyl, aryl, substituted aryl, cycloalkyl, or substituted cycloalkyl or a heterocyclic group and where $n = 0$ to 18, $m = 0$ to 18, $m + n = 24$ or less, $p = 0$ or 1 and $k = 0$ or 1.

2 Claims, No Drawings

AMINOBENZENESULFONYL-ACRYLAMIDES

BACKGROUND

This invention relates to chemical compounds generally designated as α,β-unsaturated sulfones and in particular to certain substituted arenesulfonylacrylic acid derivates which exhibit unusual bioactive characteristics.

While some arenesulfonylalkene nitriles are known to possess characteristics which aid in the control of microorganisms, as demonstrated in U.S. Pat. No. 3,159,532 to Heininger et al, I have discovered a new unsaturated sulfones which possess as good as, and in some cases far superior biocidal and biostatic activity than those heretofore synthesized.

In a copending application entitled "Method of Producing Unsaturated Sulfones", Ser. No. 815,220, filed Apr. 10, 1969, now U.S Pat. No. 3,541,119, granted Nov. 17, 1970, which is a continuation-in-part of Ser. No. 516,770, filed Dec. 27, 1965, now abandoned, in which I am a joint inventor, there is disclosed a novel one-step reaction for preparing unsaturated sulfones including those of this invention, as well as for preparing the unsaturated sulfones of the Heininger patent given above. In preparing unsaturated sulfones by this one-step method, I unexpectedly found certain novel compounds embodying this invention and discovered they had surprisingly good bioactive properties. Such bioactive properties include bactericidal and fungicidal properties. The presence of these bioactive properties allows the sulfones of this invention to be used to great advantage in the protection of organic materials from microbial attack.

Another area of important use lies in their ability to be employed as disinfectants and antimicrobials in cosmetic, pharmaceutical and medical preparations.

A further field of use of the compounds of the invention arises in agricultural applications. For example, the compounds may be used for treating plant life and soil for control of infestation and infection.

SUMMARY OF THE INVENTION

The compounds which possess the above noted properties may generally be represented by the following formulas:

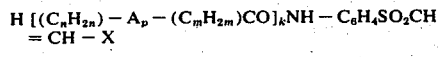

in which $n = 0$ to 18, $m = 0$ to 18, $m + n = 24$ or less, $p = 0$ or 1, $k = 0$ or 1, A is benzene or naphthalene, and X is a member of the group consisting of —CN, —CONH$_2$ —COOR, —SO$_2$R, —SO$_3$R, —NO$_2$ and —COR;

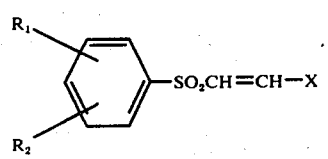

in which X is a member of the group consisting of —CN, —CONH$_2$, —COOR, —SO$_2$R, —SO$_3$R, —NO$_2$, and —COR; R$_1$ is a member of the group consisting of amino, acylamido and nitro, and R$_2$ is a member of the group consisting of hydrogen and lower alkyl; and

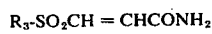

wherein R$_3$ designates alkyl, substituted alkyl, aryl, substituted aryl, cycloalkyl, substituted cycloalkyl and heterocyclic groups.

Synthesis of the compounds of the invention is thoroughly described in my copending application, mentioned above. As disclosed therein these compounds are prepared in a simple one-step reaction which comprises contacting a vicinal dihalogenide with an appropriate sulfinate compound in the presence of added alkaline material in a liquid reaction medium.

PREFERRED EMBODIMENTS OF THE INVENTION

Particularly speaking, the compounds embodying this invention are substituted arenesulfonylacrylic acid derivatives, and more particularly, substituted arenesulfonylacrylonitriles and -acrylamides.

Some of the novel compounds of the substituted arenesulfonylacrylonitrile type are as follows: acetamidobenzenesulfonylacrylonitriles, propionamidobenzenesulfonylacrylonitriles, butyramidobenzenesulfonylacrylonitriles, aminobenzenesulfonylacrylonitriles, etc. It should be noted, that the preceding examples are given in general form. This is so as it is felt that the possible isomers of the various acrylonitrile compounds listed may very well be equally as reactive.

Examples of the novel acrylamides of my invention are: 3-(4-methylbenzenesulfonyl) acrylamide, 3-(4-ethylbenzenesulfonyl) acrylamide, 3-(4-acetamidobenzenesulfonyl)acrylamide, 3-(4-propionamidobenzenesulfonyl) acrylamide, 3-(4-chlorobenzenesulfonyl) acrylamide, 3-(4-bromobenzenesulfonyl) acrylamide, 3-(4-nitrobenzenesulfonyl) acrylamide, 3-(4-aminobenzenesulfonyl) acrylamide, etc.

EXAMPLE I

This is an example of the preparation of 3-(4-acetamidobenzenesulfonyl) acrylonitrile. Approximately 0.4 moles of sodium p-acetamidobenzenesulfinate dissolved in 300 ml of methanol and 250 ml of water were charged to a reaction flask. To this solution, 0.8 moles of potassium acetate were added and when this had dissolved, 0.4 moles of 2,3-dichloropropionitrile were added with stirring. The reaction was allowed to continue with stirring for 2½ hours at a room temperature, whereupon the reaction mixture was poured into 1.5 l of cold water. The separated solid was then filtered and washed with water and then with methanol. After a drying period, 56 g of 3-(4-acetamidobenzenesulfonyl) acrylonitrile, identified by infrared spectrum, was obtained having a melting point of 273° – 276°C.

EXAMPLE II

This is an example of the preparation of 3-(4-aminobenzenesulfonyl) acrylonitrile. Approximately 126 g of crude 3-(4-acetamidobenzenesulfonyl) acrylonitrile, prepared as described in Example I was mixed with 113.5 ml of 38% HCl, 455 ml of Synasol denatured ethanol, and 455 ml of water, and refluxed for 11 hours. Next, the mixture was neutralized with 1570 g of aqueous 10% NaHCO$_3$ solution to a pH slightly over 7. The resulting precipitate of p-aminobenzenesulfonylacrylonitrile was filtered, washed, and finally dried overnight on a vacuum filter. This produced 120 g of an orange-yellow powder having a melting point of 144°-148°C.

EXAMPLE III

This is an example of the preparation of 3-(p-toluene- sulfonyl)acrylamide. A reaction flask was charged with 0.1 moles of sodium p-toluenesulfinate and 0.2 moles of sodium acetate stirred into 100 ml of methanol. Next a solution of 0.1 moles of 2,3-dichloropropionamide in 15 ml of methanol and 20 ml of acetone were added dropwise over 40 minutes to the sulfinate solution. The reaction mixture was allowed to stir for 40 hours whereupon the solids in the solution were separated by filtration and washed with 250 ml of water in portions. After drying 7.1 g of a solid melting at 177.5° – 180°C was obtained. This was followed by extracting the washings with chloroform, and after recrystallization from a methanol-chloroform solution, an additional 3.3 g of a solid with a melting point of 183° – 183.5°C was obtained. The solid was identified by infrared spectrum as 3-(p-toluenesulfonyl)acrylamide.

EXAMPLE IV

As an example of the general biocidal effects of the new compounds of the invention, the product of Example II, namely, aminobenzenesulfonylacrylonitrile, was used in the Soil Inoculum Broth Culture Technique to determine the antifungal and antibacterial activity of the chemicals of the invention. In this test a 50% wettable powder compound of 50% by weight of aminobenzenesulfonylacrylonitrile and 50% by weight of a typical pre-mix such as the following composition:

92% by weight of a dispersing powder such as Hi-Sil 233, which is a white, precipitated hydrated silica having an average particle size of 0.022 microns produced by the Columbia-Southern Chemical Corp.;

4% of a dispersing agent such as Maraperse N, which is a hetro-disperse polymer of a lignosulfonate compound having a molecular weight between 1,000 and 20,000 produced by the Marathon Corp., Chemical Division; and 4% of a surfactant such as Pluronic L61 which is an ethylene oxide-polypropylene glycol condensation compound having an average molecular weight of 2,000 produced by the Wyandotte Chemicals Corp., Michigan Alkali Division, was measured into 10 ml quantities into test tubes containing sufficient nutrient broth to give the final concentration required. To each tube was then added 1 ml of uniformly dried and prepared soil from a food source for the mixture or organisms originating from the soil. For comparison, a well known fungicide, namely, Spergon - tetrachloro- para-benzoquinone - produced by the Naugatuck Chemical Company was also tested as was the pre-mix alone and a check. The results are reflected in the following chart wherein the extent of growth is evidenced by turbidity in the various tubes and the growth classes are indicated by:

0 = no growth
1 = slight trace of growth
2 = slight growth
3 = moderate growth
4 = heavy growth
5 = very heavy growth

| Chemical | Dose Parts Per Million | Turbidity Index After- 48 hrs. | 96 hrs. | 144 hrs. |
| --- | --- | --- | --- | --- |
| 1. Aminobenzene-sulfonylacrylonitrile | 5000 | 0 | 1 | 2 |
|  | 500 | 1 | 1.5 | 3 |
|  | 50 | 1.5 | 4.5 | 4.5 |
| 2. Spergon | 5000 | 3 | 4 | 4 |
|  | 500 | 4 | 4 | 4.5 |
|  | 50 | .5 | 5 | 5 |
| 3. Pre-mix | 5000 | 5 | 5 | 5 |
|  | 500 | 5 | 5 | 5 |
|  | 50 | 5 | 5 | 5 |
| 4. Check | — | 5 | 5 | 5 |

It will be observed that in this test, the aminobenzenesulfonylacrylonitrile gives markedly superior results to the known fungicide Spergon.

EXAMPLE V

This example deals with a further fungicidal evaluation in that it is a measure of the degree of disease control of the compounds of the invention. In this Example, the Pea Seed Protectant Test is used in Pythium infested soil and also in vermiculite in the absence of the disease in order to measure the effect of the compounds on the seed itself. In other words, the latter is a measurement of the potential phytotoxicity of the compounds. For comparison, the products of Examples I, II and III are compared to Captan - a well known fungicide for the control of plant diseases.

In this test, the products of Examples I, II, and III, acetamidobenzenesulfonylacrylonitrile, aminobenzenesulfonylacrylonitrile and 3-(p-toluenesulfonyl)acrylonitrile respectively, were prepared in 50% wettable powders by using the pre-mix composition described in Example IV. These samples were then extended to 25% dust preparation by the addition of Continental Clay for better adherence to the seed coat. Next, a predetermined amount of pea seeds of the variety Thomas Laxton were treated at a dose of 4 oz./bushel based upon technical material. Treatment was accomplished by adding the required amount of chemical to the seed and then tumbling the two together until the seeds were uniformly and evenly coated.

Following the accepted Rolled Towel Procedure, two sheets of paper towel were first wetted by immersion in water. Next, heavily Pythium infested soil was spread over the towels to a depth of about ¼ inch. At this point 25 treated seeds were uniformly distributed over the soil and a final thin layer of Pythium soil distributed over the seeds. A third wet towel was placed on top and the whole roll rolled into what is termed a "doll". Three "dolls" constituting three replicates were prepared per treatment per chemical tested, including "dolls" of Captan as the standard, "dolls" of the pre-mix alone, "dolls" containing the vermiculite and "dolls" of untreated seeds in infested soil as a check. In each case, the "dolls" were placed in aluminum containers and held at 45° – 50° F for four days, removed from the containers and kept at room temperature for an additional three to five days to permit germination of the seeds. The following table reflects the results of this test:

| Chemical | Dose oz/bu | Pythium % Disease Control | Vermiculite % Germination | Phyto Rating |
| --- | --- | --- | --- | --- |
| 1. Acetamido benzenesulfonyl- acrylonitrile | 4 | 78 | 98 | 0 |

| Chemical | Dose oz/bu | Pythium % Disease Control | Vermiculite % Germination | Phyto Rating |
|---|---|---|---|---|
| 2. Aminobenzenesulfonylacrylonitrile | 4 | 57 | 90 | 0 |
| 3. 3-(p-toluenesulfonyl)-acrylamide | 4 | 29 | 88 | 0 |
| 4. Captan | 4 | 44 | 98 | 0 |
| 5. Pre-mix | 4 | 0 | 98 | 0 |
| 6. Check | 4 | 0 | 94 | 0 |

It will be noted from the above table that the acetamidobenzenesulfonylacrylonitrile and the aminobenzenesulfonylacrylonitrile were approximately 30–80% more effective than Captan as regards disease control in seeds, and did not retard to any substantial degree the seed germination.

EXAMPLE VI

This example is presented to demonstrate th fungicidal effect of 3-(4-aminobenzenesulfonyl)acrylonitrile against wood destroying fungi.

3-(4-aminobenzenesulfonyl)acrylonitrile was dissolved in acetone and the solution was added under strong agitation to nutrient agar in amounts to give final concentrations of active material in the agar plates made from the solutions of 1000, 100, 90, 80, 70, 60, 50, 40, 30, 20, 10, 1, 0.1 and 0 parts per million.

The plates were inoculated with mycelium from different fungi. After 5–7 days the growth of the mycelium was measured. The plates where no growth occurred were left for another 20 days and again checked for growth. For comparison tests with the two well-known fungicidal substances, sodium pentachlorophenate (PCP) and hydroxyquinoline (HOQ) were made. The following table shows the results that were obtained.

| Fungus | Inhibiting concentration in ppm 3-(4-aminobenzenesulfonyl) acrylonitrile | PCP | HOQ |
|---|---|---|---|
| Coniophora cerebella | 60 | — | — |
| Poria vaporaria | 100 | — | — |
| Merulius Laerumans | 60 | — | — |
| Stereum sanguinelenium | 100 | 50 | 50 |
| Polyporus zonatus | 60 | 50 | 50 |
| Ceratocystis pilifera | 100 | 50 | 100 |

EXAMPLE VII

Various compounds of the present invention having the following general formula:

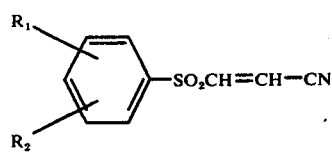

were tested to determine their minimum inhibition concentration in regard to Staphylococcus aureus 209. The test procedure is as follows:

A 1% solution of the pure compound (0.01 gm/ml) was made in acetone, acetonitrile or N,N-dimethylformamide depending on the solubility of particular compound. This solution was then diluted with acetone until the concentration of the solution was about $9 \times 10^{-6}$ gm/ml. 0.1 ml of the above solution was added to test tubes containing 4.8 ml of sterilized standard nutrient broth and a control tube was prepared containing 0.1 ml of acetone and 4.8 ml of the nutrient broth. Immediately after the preparation of the various test tubes, 0.1 ml of a saline dispersion of a freshly made 24 hour old culture of Staphylococcus aureus 209 was added to each tube, the bacteria concentration of said culture was 1,000,000 organisms/ml. The tubes were allowed to stand at 37° C for 18 hours and visual observations of the presence or lack of bacterial growth were made. The lowest concentration at which growth could not be observed was called the minimum inhibition concentration (MIC) and was expressed in parts per million (ppm).

The following table is in summary of the various samples tested:

| Sample No. | $R_1$ | $R_2$ | MIC ppm |
|---|---|---|---|
| 1 | 4-NH$_2$ | H | 1.5 |
| 2 | 3-NH$_2$ | H | <0.37 |
| 3 | 3-NH$_2$.HCl | H | <0.18 |
| 4 | 3-NH$_2$ | 4-CH$_3$ | 0.75 |
| 5 | 4-HCONH | H | 3.0 |
| 6 | 4-CH$_3$CONH | H | 1.5 |
| 7 | 4-CH$_3$CH$_2$CONH | H | 0.37 |
| 8 | 4-CH$_3$(CH$_2$)$_2$CONH | H | 6.0 |
| 9 | 4-CH$_3$(CH$_2$)$_3$CONH | H | 0.37 |
| 10 | 4-(CH$_3$)$_2$CH.CH$_2$CONH | H | 3.0 |
| 11 | 4-CH$_3$(CH$_2$)$_4$CONH | H | 0.37 |
| 12 | 4-CH$_3$(CH$_2$)$_5$CONH | H | 0.37 |
| 13 | 4-CH$_3$(CH$_2$)$_6$CONH | H | 1.5 |
| 14 | 4-CH$_3$(CH$_2$)$_7$CONH | H | 1.5 |
| 15 | 4-CH$_3$(CH$_2$)$_{10}$CONH | H | 0.37 |
| 16 | 3-CH$_3$(CH$_2$)$_{10}$CONH | H | 0.25 |
| 17 | 4-CH$_3$(CH$_2$)$_{12}$CONH | H | 0.37 |
| 18 | 4-CH$_3$(CH$_2$)$_{14}$CONH | H | 0.37 |
| 19 | 3-CH$_3$(CH$_2$)$_{14}$CONH | H | 6.0 |
| 20 | 3-CH$_3$(CH$_2$)$_{14}$CONH | 4-CH$_3$ | 0.18 |
| 21 | 4-CH$_3$(CH$_2$)$_{17}$CONH | H | 50.0 |
| 22 | 4-[C$_6$H$_5$—CONH] | H | 3.0 |
| 23 | 3-[C$_6$H$_5$—CONH] | H | 6.0 |
| 24 | 3-[C$_6$H$_5$—CONH] | 4-CH$_3$ | 1.5 |
| 25 | 4-[C$_6$H$_5$—CH$_2$CONH] | H | 0.75 |
| 26 | 3-[C$_6$H$_5$—CH$_2$CONH] | H | 3.0 |
| 27 | [4-Naphthalene-1-CONH] | H | 1.5 |
| 28 | [4-Naphthalene-2-CONH] | H | 0.37 |

| Sample No. | R₁ | R₂ | MIC ppm |
|---|---|---|---|
| 29 | [4-Naphthalene-2-CH₃CONH] | H | 0.37 |

EXAMPLE VIII

The same test method as given in Example VII was employed in this example. However, the compounds tested may be described by the following general formula:

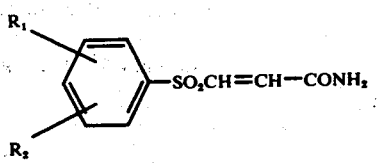

| Sample No. | R₁ | R₂ | MIC ppm |
|---|---|---|---|
| 1 | 4-NH₂ | H | 25.0 |
| 2 | 3-NH₂ | 4-CH₃ | 12.0 |
| 3 | 4-CH₃CONH | H | 0.37 |
| 4 | 4-CH₃(CH₂)₃CONH | H | 0.37 |
| 5 | 4-CH₃(CH₂)₁₀CONH | H | 0.75 |
| 6 | 3-NO₂ | H | 0.37 |
| 7 | 3-NO₂ | 4-CH₃ | 0.75 |

EXAMPLE IX

Compounds of the following formula:

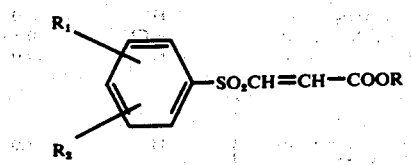

were tested for their batericidal and bacteriostatic qualities by the same procedure given in Example VII. The results are tabulated below:

| Sample No. | R₁ | R₂ | R | MIC ppm |
|---|---|---|---|---|
| 1 | 4-NH₂ | H | methyl | 6.0 |
| 2 | 4-NH₂ | H | isopropyl | 6.0 |
| 3 | 4-NH₂ | H | isobutyl | 12.0 |
| 4 | 3-NH₂ | 4-CH₃ | methyl | 12.0 |
| 5 | 3-NH₂ | 4-CH₃ | ethyl | 12.0 |
| 6 | 3-NH₂ | 4-CH₃ | isobutyl | 3.0 |
| 7 | 4-CH₃CONH | H | ethyl | 3.0 |
| 8 | 3-CH₃(CH₂)₁₀CONH | 4-CH₃ | isopropyl | 0.37 |
| 9 | 4-[⟨◯⟩—CONH] | H | methyl | 3.0 |
| 10 | 4-[⟨◯⟩—CONH] | H | ethyl | 3.0 |

In the controls that were set up for this Example as well as in Examples VII and VIII growth of the bacteria was observed to occur quite freely.

From the above Examples it is seen that the novel compounds of this invention clearly are capable of inhibiting the growth of bacteria and fungi when applied in growth-inhibiting amounts to said bacteria and fungi. Moreover, while this invention has been described in detail, it is understood that there are without a doubt alternative embodiments that will be apparent to those skilled in the art. Accordingly, modifications are contemplated which can be made without departing from the spirit of the invention or the scope of the appended claims.

Having thus described the invention, what is claimed is:

1. A compound of the formula

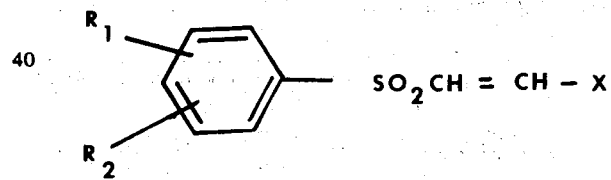

wherein R₁ is amino, R₂ is hydrogen or lower alkyl and X is —CONH₂.

2. A compound according to claim 1 which is 3-(4-aminobenzenesulfonyl) acrylamide.

* * * * *

UNITED STATES PATENT OFFICE
CERTIFICATE OF CORRECTION

Patent No. 3,976,668   Dated August 24, 1976

Inventor(s) SVEN U.K.A. RICHTER

It is certified that error appears in the above-identified patent and that said Letters Patent are hereby corrected as shown below:

Column 1, before "Background": should read -- CROSS-REFERENCE TO RELATED APPLICATIONS This application is a division of application Serial No. 228,410, filed February 22, 1972, now U.S. Patent No. 3,821,399, which is a continuation of application Serial No. 844,176, filed July 23, 1969 (now abandoned) and which is in turn, a continuation-in-part of application Serial No. 545,835, filed April 28, 1966, now abandoned. --.

Column 1, lines 49-50: "$H[(C_nH_{2n})-A_p-(C_mH_{2m})CO]_kNH-C_6H_4SO_2CH=CH-X$" should read -- $H[(C_nH_{2n})-A_p-(C_mH_{2m})CO]_kNH-C_6H_4SO_2CH=CH-X$ (a) --.

Column 2, lines 56-57: "273°-276°C." should read -- 272°-276°C. --; line 64: "38%" should read -- 36% --.

Column 4, line 66: "78" should read -- 79 --.

Column 5, line 22: "th" should read -- the --.

Column 8, table, line 7 under "MIC ppm.": "3.0" should read -- 6.0 --.

Signed and Sealed this

Nineteenth Day of October 1976

[SEAL]

Attest:

RUTH C. MASON
Attesting Officer

C. MARSHALL DANN
Commissioner of Patents and Trademarks